US008054305B2

(12) United States Patent
Sagano

(10) Patent No.: US 8,054,305 B2
(45) Date of Patent: Nov. 8, 2011

(54) IMAGE DISPLAY APPARATUS, CORRECTION CIRCUIT THEREOF AND METHOD FOR DRIVING IMAGE DISPLAY APPARATUS

(75) Inventor: Osamu Sagano, Inagi (JP)

(73) Assignee: Canon Kabushiki Kaisha, Toyko (JP)

( * ) Notice: Subject to any disclaimer, the term of this patent is extended or adjusted under 35 U.S.C. 154(b) by 484 days.

(21) Appl. No.: 12/390,072

(22) Filed: Feb. 20, 2009

(65) Prior Publication Data

US 2009/0219268 A1 Sep. 3, 2009

(30) Foreign Application Priority Data

Feb. 29, 2008 (JP) ................................ 2008-050345

(51) Int. Cl.
*G06F 3/038* (2006.01)

(52) U.S. Cl. ............... 345/208; 345/55; 345/77; 345/63

(58) Field of Classification Search ........................ None
See application file for complete search history.

(56) References Cited

U.S. PATENT DOCUMENTS 5,659,328 A 8/1997 Todokoro et al. ............... 345/74
5,734,361 A 3/1998 Suzuki et al. ................... 345/74
6,580,407 B1 6/2003 Suzuki et al. ................ 345/74.1
6,653,794 B2 11/2003 Sagano et al. ............. 315/169.2
6,842,160 B2 1/2005 Yamazaki et al. .............. 345/76
6,870,522 B2 3/2005 Sagano et al. ............... 345/75.2
6,873,308 B2 3/2005 Sagano et al. ............... 345/75.2
6,952,193 B2 10/2005 Abe et al. ........................ 345/87
7,046,219 B2 5/2006 Kanai et al. .................. 345/75.2
7,079,161 B2 7/2006 Sagano et al. ................ 345/690
7,154,457 B2 12/2006 Sagano et al. .................. 345/78
7,315,314 B2 1/2008 Sagano et al. ................ 345/690
7,417,610 B2 8/2008 Abe et al. ......................... 345/87
7,432,884 B2 10/2008 Kanai et al. .................. 345/75.2
2003/0006976 A1 1/2003 Sagano et al. ................ 345/204
2003/0011545 A1 1/2003 Sagano et al. .................. 345/76
2003/0030654 A1 2/2003 Sagano et al. ................ 345/660
2003/0107542 A1* 6/2003 Abe et al. ......................... 345/89
2004/0257311 A1 12/2004 Kanai et al. .................. 345/75.2
2005/0007328 A1 1/2005 Yamazaki et al. .............. 345/89
2005/0190119 A1* 9/2005 Yamazaki et al. .............. 345/59
2006/0017718 A1 1/2006 Sagano et al. ................ 345/204
2006/0192493 A1 8/2006 Kanai et al. ................... 315/161
(Continued)

FOREIGN PATENT DOCUMENTS

JP 2-257553 10/1990
JP 7-181911 7/1995
JP 8-248920 9/1996
(Continued)

*Primary Examiner* — Muhammad N Edun
(74) *Attorney, Agent, or Firm* — Fitzpatrick, Cella, Harper & Scinto

(57) ABSTRACT

A correction circuit includes a timing control circuit for dividing a drive period assigned for drive of display devices into plural calculation slots, a luminance calculation circuit for calculating luminance including an effect of a voltage drop for each calculation slot, an accumulation circuit for temporally accumulating the luminance for each calculation slot, a corrected data determination circuit for outputting, as a corrected data, the value determined in accordance with the calculation slot at the time point when the accumulated luminance reaches a target luminance value, and a conversion circuit for converting the corrected data into modulation data to be applied to a modulation circuit. The width of the calculation slot is shorter than the width of the slot for pulse width modulation in at least a part of the drive period. The conversion circuit reduces the bit width of the corrected data by pseudo-gradation processing.

16 Claims, 12 Drawing Sheets

U.S. PATENT DOCUMENTS

| | | | | |
|---|---|---|---|---|
| 2006/0256142 | A1 | 11/2006 | Sagano et al. | 345/690 |
| 2009/0009450 | A1 | 1/2009 | Abe et al. | 345/87 |
| 2009/0219308 | A1 | 9/2009 | Sagano | 345/690 |
| 2009/0244037 | A1 | 10/2009 | Sagano | 345/204 |

FOREIGN PATENT DOCUMENTS

| | | |
|---|---|---|
| JP | 2003-223131 | 8/2003 |
| JP | 2003-233344 | 8/2003 |
| JP | 2005-31636 | 2/2005 |

* cited by examiner

FIG. 10

| | BLOCK 0 | BLOCK 1 | BLOCK 2 | BLOCK 3 |
|---|---|---|---|---|
| ≧0 | 7 | 7 | 7 | 7 |
| ≧4 | 6 | 7 | 6 | 6 |
| ≧8 | 6 | 7 | 5 | 6 |
| ≧12 | 5 | 6 | 5 | 6 |
| ≧16 | 5 | 6 | 5 | 4 |
| ⋮ | ⋮ | ⋮ | ⋮ | ⋮ |
| ≧252 | 2 | 2 | 1 | 0 |
| =255 | 1 | 0 | 0 | 0 |

IMAGE DISPLAY APPARATUS, CORRECTION CIRCUIT THEREOF AND METHOD FOR DRIVING IMAGE DISPLAY APPARATUS

BACKGROUND OF THE INVENTION

1. Field of the Invention

This invention relates to an image display apparatus.

2. Description of the Related Art

Japanese Patent Application Laid-Open No. 2-257553 discloses a technique for controlling the pulse width of the voltage applied to each of the modulation electrodes to compensate for the variation in the amount of the electron beams emitted from plural electron-emitting devices due to the variation of the voltages applied to the electron-emitting devices.

Japanese Patent Application Laid-Open No. 8-248920 (U.S. Pat. No. 5,734,361) discloses an image forming apparatus using electron-emitting devices arranged in simple matrix. This image forming apparatus includes a drive signal generating means for outputting a drive pulse to plural column wirings for driving a cold cathode devices connected to a selected row wiring. This drive signal generating means outputs a drive pulse corrected by a correction value corresponding to each column wiring.

Japanese Patent Application Laid-Open No. 2003-223131 (US 2003/0006976 A1; U.S. Pat. No. 7,079,161), discloses a configuration in which in order to reduce the hardware for calculating the correction value, the row wirings have plural reference positions for which a correction value is determined. The apparatus also discloses the configuration in which the correction values other than those for the reference positions are determined by interpolating the correction values determined for the reference positions. Japanese Patent Application Laid-Open No. 2003-223131 (US 2003/0006976 A1; U.S. Pat. No. 7,079,161) further discloses a method for calculating the voltage drop amount using a degenerate model and an algorithm for calculating the correction value from the voltage drop amount.

In the method disclosed by Japanese Patent Application Laid-Open No. 2003-223131 (US 2003/0006976 A1; U.S. Pat. No. 7,079,161), the voltage drop amount is estimated from the image data before correction and the correction value of the image data is determined based on the voltage drop amount thus estimated. In the case where the shape of the drive pulse changes due to the correction, the voltage drop status changes and the emission current amount may also change. The method disclosed by Japanese Patent Application Laid-Open No. 2003-223131 (US 2003/0006976 A1; U.S. Pat. No. 7,079,161), however, approximately ignores the change in the voltage drop status due to the correction. In the case where this correction method is used for a display panel large in voltage drop amount, therefore, the correction error is so large that the image quality may be deteriorated.

SUMMARY OF THE INVENTION

In the image display apparatus, a signal loss such as a voltage drop deteriorates the quality of the image displayed. Efforts have been made in the past to suppress the image quality deterioration by the correction, and the correction with a higher accuracy is desired.

The object of this invention is to provide a technique for improving the accuracy of correction of the voltage drop and realizing the image display of high quality.

According to a first aspect of the invention, there is provided an image display apparatus for driving a plurality of display devices through a plurality of row wirings and a plurality of column wirings in matrix, comprising:

a modulation circuit that outputs a pulse width modulation signal for driving the display device to the column wiring based on modulation data; and a correction circuit that outputs the modulation data to be applied to the modulation circuit, based on luminance data designating luminance of the display device, wherein the correction circuit includes:

a timing control circuit that divides a drive period assigned for drive of the display devices into a plurality of calculation slots;

a luminance calculation circuit that calculates luminance including an effect of a voltage drop in the row wiring for each calculation slot;

an accumulation circuit that temporally accumulates the luminance for each calculation slot;

a corrected data determination circuit that outputs, as a corrected data, a value determined in accordance with the calculation slot at a time point when an accumulated luminance value obtained by the temporal accumulation reaches a target luminance value; and a conversion circuit that converts the corrected data into the modulation data;

wherein a width of the calculation slot is shorter than a width of a slot for pulse width modulation by the modulation circuit in at least a part of the drive period; and wherein the conversion circuit reduces a bit width of the corrected data by pseudo-gradation processing.

According to a second aspect of the invention, there is provided a correction circuit for an image display apparatus, wherein the image display apparatus drives a plurality of display devices through a plurality of row wirings and a plurality of column wirings in matrix, and includes a modulation circuit for outputting a pulse width modulation signal to the column wiring for driving the display device based on modulation data;

the correction circuit outputting the modulation data to be applied to the modulation circuit, based on luminance data designating luminance of the display device;

the correction circuit including:

a timing control circuit that divides a drive period assigned for drive of the display devices into a plurality of calculation slots;

a luminance calculation circuit that calculates luminance including an effect of a voltage drop in the row wiring for each calculation slot;

an accumulation circuit that temporally accumulates the luminance for each calculation slot;

a corrected data determination circuit that outputs, as a corrected data, a value determined in accordance with the calculation slot at a time point when an accumulated luminance value obtained by the temporal accumulation reaches a target luminance value; and a conversion circuit that converts the corrected data into the modulation data;

wherein a width of the calculation slot is shorter than a width of a slot for pulse width modulation by the modulation circuit in at least a part of the drive period; and wherein the conversion circuit reduces a bit width of the corrected data by pseudo-gradation processing.

According to a third aspect of the invention, there is provided an image display apparatus driving method for driving a plurality of display devices through a plurality of row wirings and a plurality of column wirings in matrix, comprising:

a correction step of outputting modulation data based on luminance data designating luminance of the display device; and a modulation step of outputting a pulse width modulation signal to the column wiring for driving the display device, based on the modulation data, wherein the correction step includes the steps of:

dividing a drive period assigned for drive of the display devices into a plurality of calculation slots;

calculating luminance including an effect of a voltage drop in the row wiring for each calculation slot;

temporally accumulating the luminance for each of the calculation slots;

outputting, as a corrected data, a value determined in accordance with the calculation slot at a time point when an accumulated luminance value obtained by the temporal accumulation reaches a target luminance value; and converting the corrected data into the modulation data, wherein a width of the calculation slot is shorter than a width of a slot for pulse width modulation by the modulation circuit in at least a part of the drive period, and wherein the modulation data is generated by reducing a bit width of the corrected data by pseudo-gradation processing.

According to this invention, the voltage drop correction accuracy is improved and the image display high in quality can be realized.

Further features of the present invention will become apparent from the following description of exemplary embodiments with reference to the attached drawings.

BRIEF DESCRIPTION OF THE DRAWINGS

FIG. 10 is a diagram showing an example of a histogram calculated for the image data on a given row;

DESCRIPTION OF THE EMBODIMENTS

Figure 1:
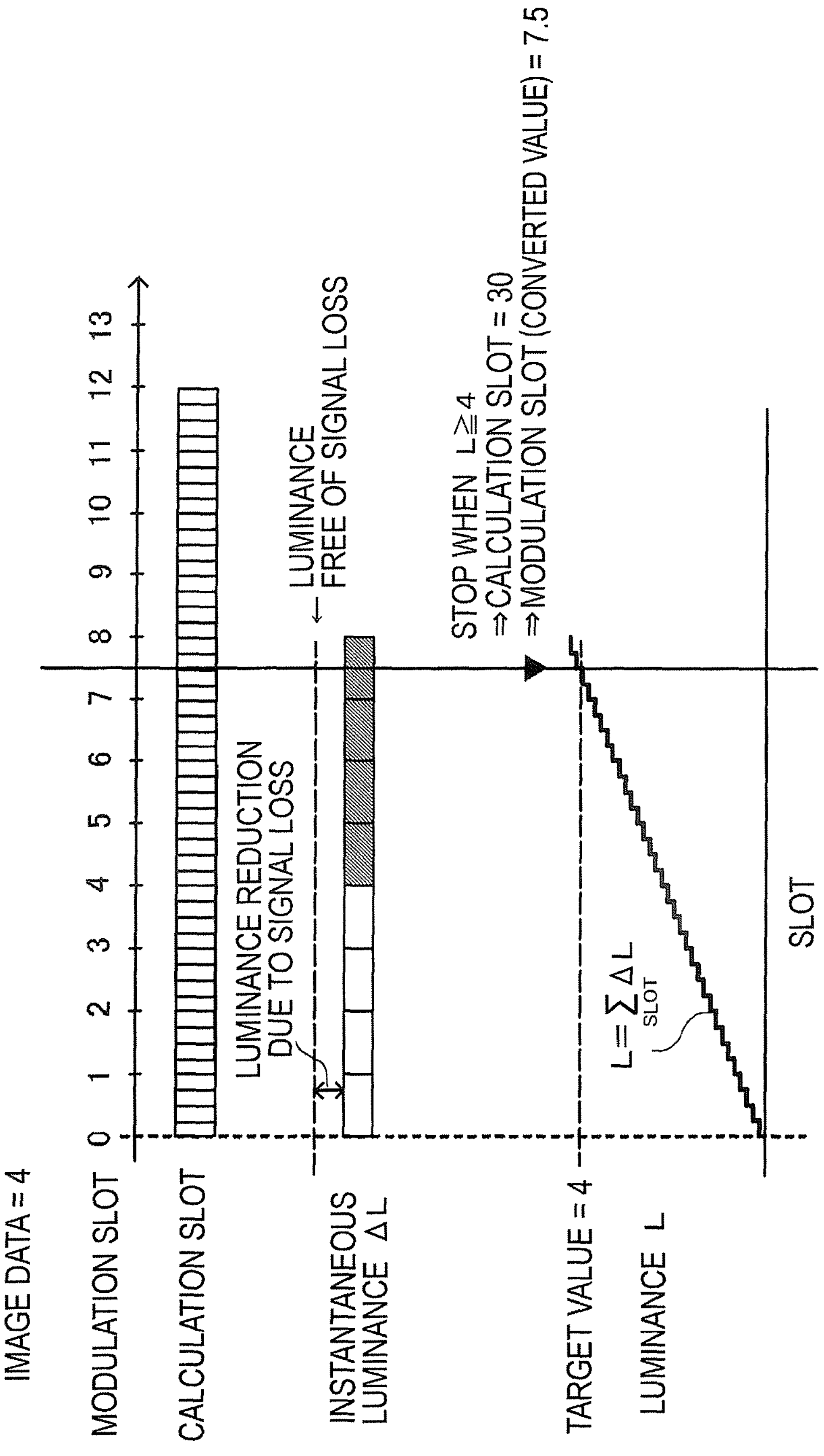
FIG. 1 is a diagram showing an example of calculation of a corrected data according to a first embodiment.

This invention is preferably applicable to a display apparatus for displaying an image by driving plural display devices (display elements). This invention is especially preferably applicable to a display apparatus configured so that the loss of the signal supplied to a predetermined display device has an effect on the lighting state of other display devices. In the case where plural display devices are connected in one row wiring (scan wiring) and each of the display devices is connected with the column wiring (modulation wiring), for example, the lighting state of each display device is affected by the lighting state of other display devices. A more specific example is a configuration in which plural display devices are driven in line sequence in plural row wirings and plural column wirings in matrix. The display devices are driven by supplying the scanning signal to the row wiring as a shared wiring and supplying the modulation signals from the column wirings. In the process, the signal level on the row wiring is varied from one position to another on the row wiring. This is by reason of the fact that a voltage drop is caused by the current flowing in the row wiring. The voltage drop, i.e. the signal loss is large, therefore, at a position of a large distance from the signal source. The value of the current flowing in the row wiring is determined by the driving state (lighting state) of each display device. The driving state of each display device is determined, for example, by the data such as the luminance data designating the luminance (brightness) of each display device. Therefore, the signal loss depends on the image to be displayed as well as the distance from the position of the signal source.

This invention is preferably applicable to the image display apparatus having a display panel (matrix panel) with a multiplicity of display devices arranged in matrix. This type of the image display apparatus includes the electron beam display apparatus, the plasma display apparatus, the liquid crystal display apparatus or the organic EL display apparatus. The electron beam display apparatus preferably uses, as a display device, a cold cathode device (electron-emitting device) such as the field emission electron-emitting device, the MIM (metal/insulator/metal) electron-emitting device or the surface conduction electron-emitting device. This invention is especially applicable preferably to the image display apparatus using a display device having the light emission characteristic with the luminance changing with the light emission time. In the cold cathode device for emitting electrons to the phosphor, for example, the luminance may be changed due to the saturation characteristic of the phosphor. The cold cathode device (electron-emitting device), therefore, is a preferable form of application of the invention.

The configuration having the surface conduction electron-emitting device as an electron-emitting device is illustrated below. The surface conduction electron-emitting device is especially preferable as an application of the invention due to the feature that a great amount of the current flows in the row wiring and the voltage drop amount is large.

Embodiments of the invention are explained below with reference to the drawings.

First Embodiment

The image display apparatus according to the first embodiment generally includes a display panel with plural surface conduction electron-emitting devices arranged in simple matrix, a driving circuit (scan circuit, modulation circuit) for driving the display panel, and a correction circuit. According to this embodiment, the driving circuit drives the row wirings (scan wirings) in line sequence and applies the modulation pulse in which at least a pulse width is modulated to the column wirings (modulation wirings). The lighting time of each device is controlled by the pulse width. In addition to the lighting time control by the pulse width modulation (PWM), the lighting strength within a lighting period is desirably controlled by the pulse height modulation (PHM). In the description that follows, however, only the pulse width modulation is shown as an example to facilitate the understanding.

In the image display apparatus according to this embodiment, the input image data is corrected by the correction circuit and the corrected image data is transmitted to the driving circuit thereby to correct the effect of the voltage drop constituting a signal loss. As a result, a desirable image can be displayed on the image display apparatus. Further, in the image display apparatus according to this embodiment, the correction is made also taking the saturation characteristic of the phosphor into consideration to realize the correction with higher accuracy.

First, the concept of voltage drop correction from which this invention is derived is described, followed by the description of a specific configuration for improving the correction accuracy. Incidentally, the effect of the voltage drop in the pulse width modulation is described in Japanese Patent Application Laid-Open No. 2003-223131, paragraphs [0084] to [0095] (US 2003/0006976 A1, paragraphs to [0107]).

(Image Display Apparatus)

Figure 2:
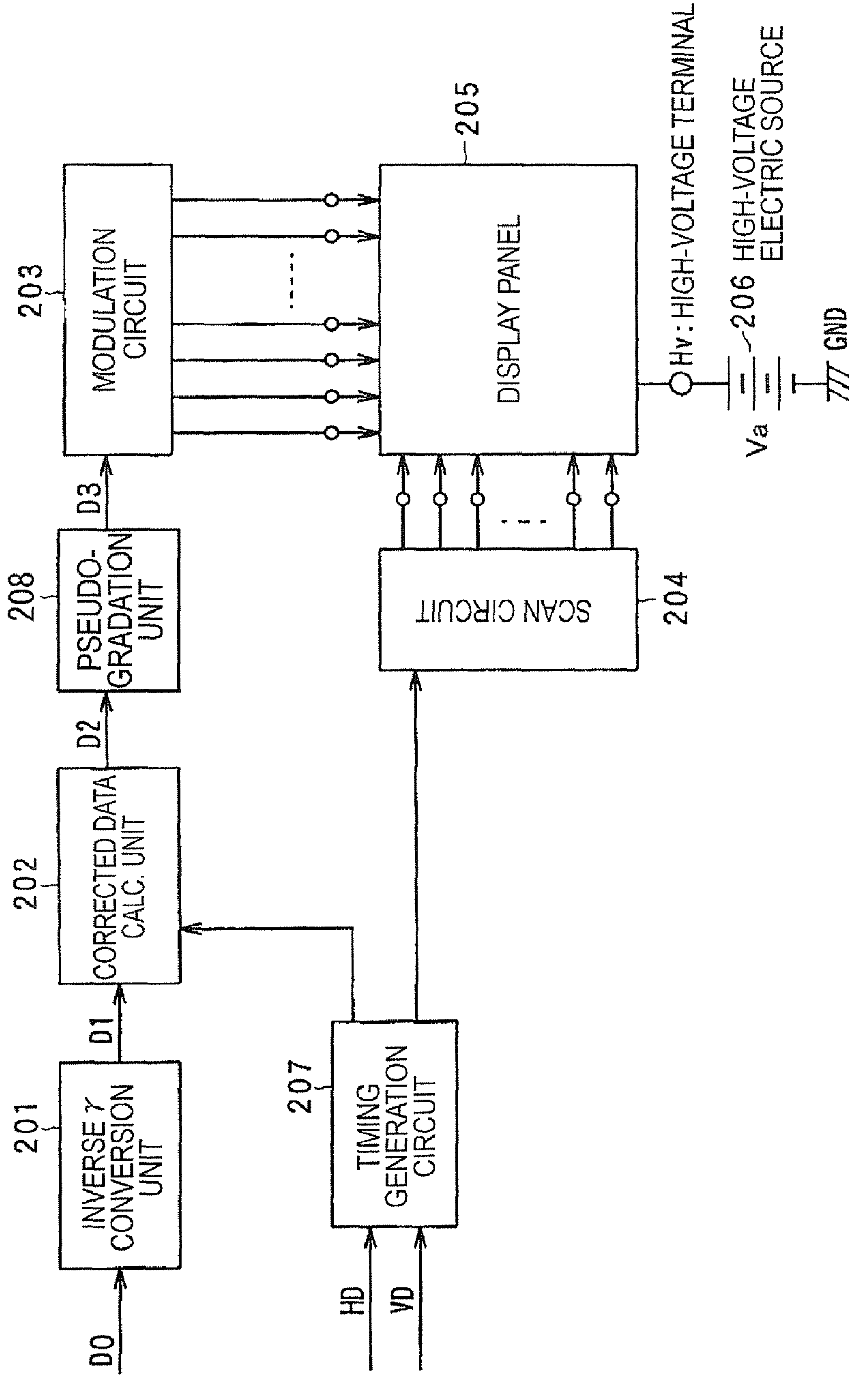
FIG. 2 is a block diagram showing an image display apparatus according to the first embodiment.

FIG. 2 is a block diagram showing an image display apparatus according to this embodiment. The image display apparatus includes an inverse γ conversion unit 201, a corrected data calculation unit 202, a modulation circuit 203, a scanning circuit 204, a display panel 205, a high-voltage electric source 206, a timing generation circuit 207 and a pseudo-gradation unit 208.

(Display Panel 205)

Figure 12:
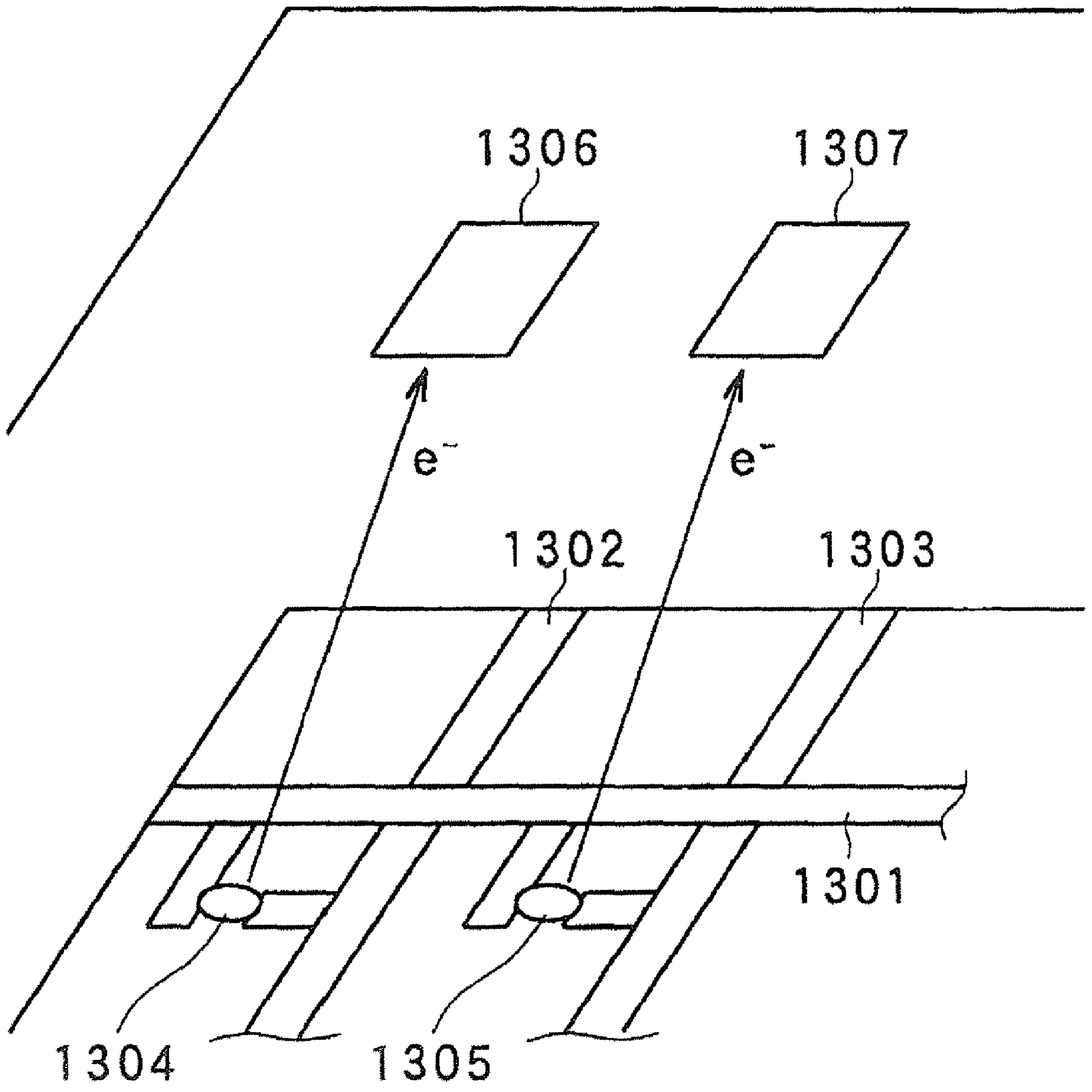
FIG. 12 is a diagram showing a structure of a display panel.

FIG. 12 schematically shows a structure of the display panel 205. The display panel 205 includes a rear plate and a face plate. Plural electron-emitting devices (display devices) 1304, 1305 are arranged on the rear plate (electron source board). The electron-emitting devices are connected in simple matrix by plural modulation wirings (column wirings) 1302, 1303 and plural scan wirings (row wirings) 1301. Light-emitting members (phosphor) 1306, 1307 corresponding to the electron-emitting devices 1304, 1305 are formed on the face plate. Also, the anode electrode called the metal back is arranged on the face plate. A high voltage Va is applied to the anode electrode from a high voltage electric source 206 through a high voltage terminal Hv.

The scan circuit 204 applies the scanning signal (select potential) to any one of the scan wirings and the modulation circuit 203 applies a modulation signal (modulated pulse) to each modulation wiring. Once the potential difference between the scanning signal and the modulation signal exceeds a threshold voltage, electrons are emitted from the corresponding electron-emitting device. The electrons are accelerated by the high voltage Va and collides against the light-emitting member, thereby emitting light. The image is formed by the mass of the light from the display devices. The luminance of the light is controlled by the radiation amount of electrons from the electron-emitting devices. The electron radiation amount is controlled by the magnitude and the application time of the voltage applied to the electron-emitting devices. In this way, the desired electron emission amount can be obtained by controlling the potential difference between the scanning signal and the modulation signal and the modulation signal application time within the scanning signal application period.

(Modulation Circuit 203)

The modulation circuit 203 is connected to the modulation wirings of the display panel 205. The modulation data D3 is input to the modulation circuit 203 from the pseudo-gradation unit 208 and the timing data is input from the timing generation circuit 207. The modulation circuit 203 generates a pulse width modulation signal based on the input modulation data D3. Specifically, the modulation circuit 203 determines the non-off time (on time) of the modulation signal by counting the clock signal in the number designated by the modulation data D3. One period of the clock signal constitutes the unit time for controlling the lighting time of the display devices (hereinafter referred to as "the slot for pulse width modulation" or simply as "the modulation slot"). In the pulse width modulation of M steps (M: an integer of 1 or more), for example, the drive period assigned to the drive of the display devices is divided into (M−1) modulation slots. Incidentally, the drive period corresponds to the maximum pulse width and is determined, for example, based on the horizontal scanning period or the row wiring select period. The modulation circuit 203 outputs one row of the modulation signal to each modulation wiring.

(Scan Circuit 204)

The scan circuit 204 is connected to the scan wirings of the display panel 205. The scan circuit 204 supplies the scanning signal (select potential) to the scan wiring(s) connected with the electron-emitting devices to be driven. Incidentally, the scan wirings not driven are supplied with a non-select potential. Generally, the scan circuit 204 scans the scan wirings in line sequence by selecting one row at a time. The scanning scheme employed includes the interlace scan or the multi-line scan with plural rows selected at a time.

(Timing Generation Circuit 207)

The timing generation circuit 207 generates the timing signal based on the horizontal sync HD and the vertical sync VD of the video signal. Each circuit of the image display apparatus operates based on this timing signal.

(Inverse γ Conversion Unit 201)

The inverse γ conversion unit 201 is supplied with the image data D0. The image data D0 corresponds to, for example, the color video signals R, G, B in the color image display apparatus. The R, G, B data are input to the inverse γ conversion unit 201 pixel by pixel.

The display panel 205 having the surface conduction electron-emitting devices has such a characteristic that the light of the luminance substantially linear against the pulse application time is emitted in the drive operation by pulse width modulation. The inverse γ conversion unit 201, therefore, generates the image data D1 by converting the image data D0 along the 2.2-power curve in order to adjust the image data to the linear luminance characteristic of the display panel 205. This image data D1 has a value proportional to the luminance. The inverse γ conversion unit 201 supplies the image data D1 to the corrected data calculation unit 202. This image data D1 is the luminance data for designating the luminance of the display devices.

(Correction Circuit)

In the pulse width modulation with the image data D1 having a value proportional to the luminance, the luminance cannot be obtained as expected. This is by reason of the fact that the voltage drop occurs in the row wirings as described above. In order to reduce the effect of the voltage drop and obtain the target luminance value, therefore, the correction circuit generates the modulation data D3 to be applied to the modulation circuit 203, based on the image data D1. According to the first embodiment, the corrected data calculation unit 202 and the pseudo-gradation unit (conversion circuit) 208 make up the correction circuit.

(Corrected Data Calculation Unit 202)

Figure 9:
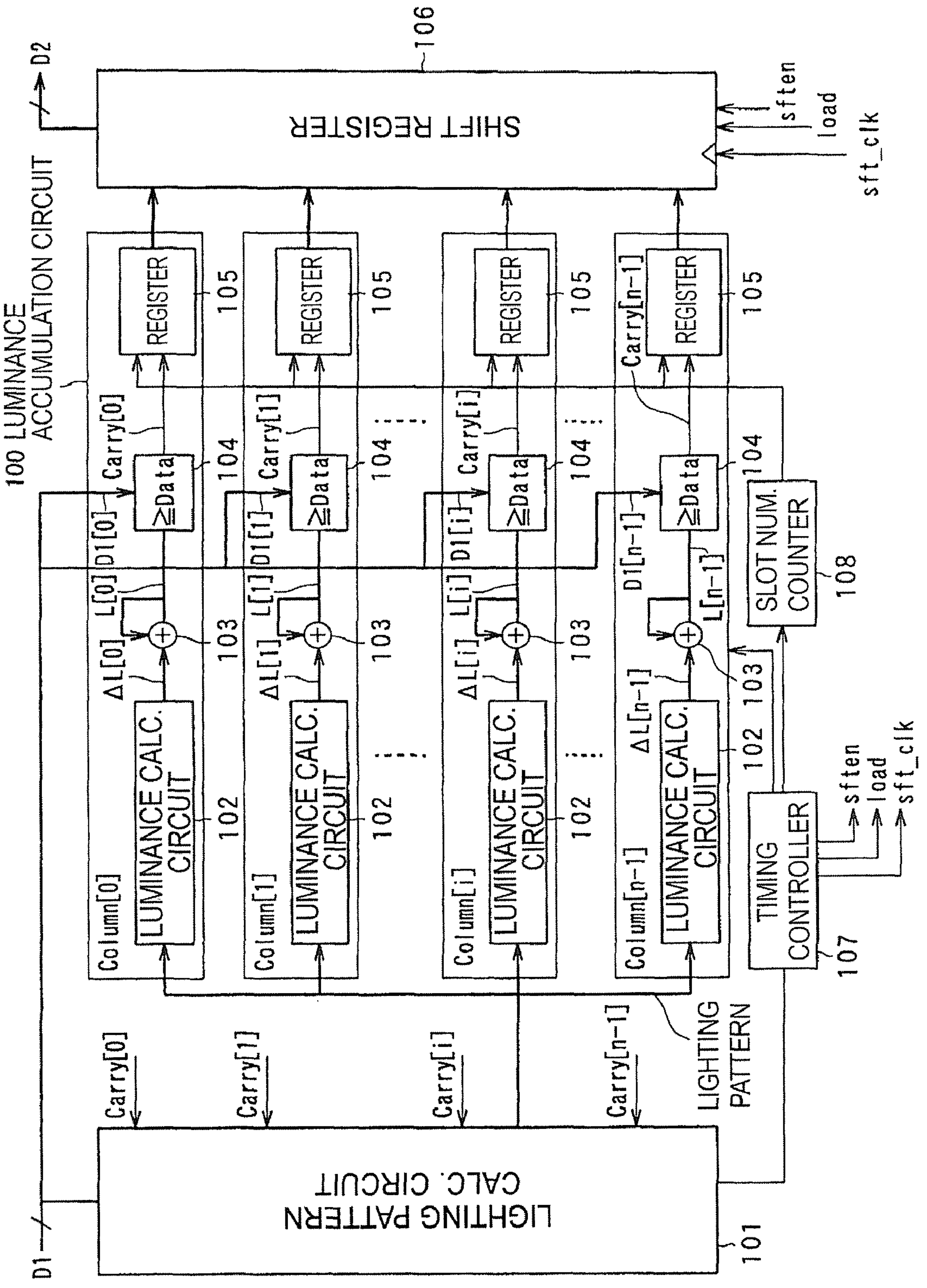
FIG. 9 is a diagram showing the structure of the corrected data calculation unit according to the first embodiment.

The corrected data calculation unit 202 outputs the corrected data D2 based on the image data D1. FIG. 9 shows the configuration of the corrected data calculation unit 202.

The corrected data calculation unit 202 is configured of a lighting pattern calculation circuit 101, a luminance accumulation circuit 100, a shift register 106, a timing controller 107 and a slot number counter 108. The luminance accumulation circuit 100 includes a luminance calculation circuit 102, an accumulation circuit (accumulator) 103, a comparator 104 and a register 105. According to this embodiment, the luminance accumulation circuit 100 is arranged for each column wiring of the display panel 205. The provision of the luminance accumulation circuit 100 for each column wiring advantageously makes it possible to execute the correction operation for all the column wirings in parallel and calculate the corrected data quickly.

The timing controller 107 is a timing control circuit for controlling the operation of the luminance accumulation circuit 100 and the operation of the slot number counter 108 for each modulation wiring. The timing controller 107 supplies the luminance accumulation circuit 100 with the clock signal for dividing the device drive period into plural time slots. One period of the clock signal constitutes the unit time of one luminance calculation (hereinafter referred to as "the calculation slot"). The timing controller 107 can control the width of the calculation slot by changing the cycle of the clock signal. The width of the calculation slot may be constant or changed through the whole drive period. According to this embodiment, the width of the calculation slot is set to a value (¼, for example) shorter than the width of the modulation slot.

The slot number counter 108 counts the slots in synchronism with the calculation slots. In the case where the width of the calculation slot is constant through the whole drive period, the slot number counter 108 counts the slots one by one. In the process, the value held in the slot number counter 108 coincides with the number of times the luminance is calculated (accumulated) In the case where the width of the calculation slot changes during the drive period, the slot number counter 108 counts up in accordance with the width of the calculation slot. For example, the count is doubled when the slot has the double width.

The luminance calculation circuit 102 calculates the luminance including the effect of the voltage drop in the row wiring for each calculation slot. Specifically, the luminance calculation circuit 102 is supplied with the lighting pattern of the whole modulation wirings to calculate the luminance ΔL[I] at the modulation wiring I (column I). The luminance ΔL[I] is a value indicating the instantaneous luminance of the I-th display device in a given calculation slot. The luminance value ΔL is normalized in such a manner that the luminance in one modulation slot is 1 in the absence of the voltage drop. The luminance ΔL[I] is calculated for each slot.

The luminance ΔL[I] is varied from one column to another. This is because the voltage drop amount is different at a different position on the row wiring. The voltage drop amount at each column can be calculated from the lighting pattern (lighting state of each device) and the wiring resistance. The voltage actually applied to the display devices at each column can be calculated from the voltage drop amount. Further, the luminance ΔL can be calculated from the voltage-emission current characteristic of the devices and the phosphor characteristic. The luminance ΔL may be calculated each time. In view of the fact that the value of the luminance ΔL is determined uniquely for the lighting pattern, however, the luminance calculation circuit 102 is preferably configured of a look-up table (memory) which stores the values of the luminance ΔL corresponding to respective lighting patterns. In this way, both the calculation load is reduced and the circuit is simplified at the same time.

The lighting pattern calculation unit 101 is for generating a lighting pattern for each time slot. The lighting pattern is data indicating the lighting state of all the display devices on the selected row (i.e. the state of all the column wirings). In the case where the lighting state of the display devices is indicated as 1 for on state and 0 for off state, for example, the lighting pattern with all the four display device (four column wirings) on is given as (1, 1, 1, 1).

According to this embodiment, no correction is made to shorten the lighting time. With regard to the first period (the period when the time slot T=0), therefore, the lighting state after correction is not required to be predicted. Therefore, the lighting state for the first period can be determined from the input image data. With regard to each of the second and subsequent periods, on the other hand, the lighting state of each display device may be affected by the correction, and therefore, it is not desirable to set the lighting state only by the input image data. According to this embodiment, therefore, the lighting state of each display device after correction is predicted, and the next correction calculation is carried out utilizing the predicted lighting state. To make this process possible, the lighting pattern set in the lighting pattern calculation circuit 101 is adapted to be rewritable based on the result of the correction calculation. Incidentally, the modulation signal is applied actually after complete arithmetic operation in the correction circuit. In the stage of the correction calculation, therefore, the correction result is yet to be reflected in the lighting operation.

(Operation of Corrected Data Calculation Unit 202)

Figure 3:
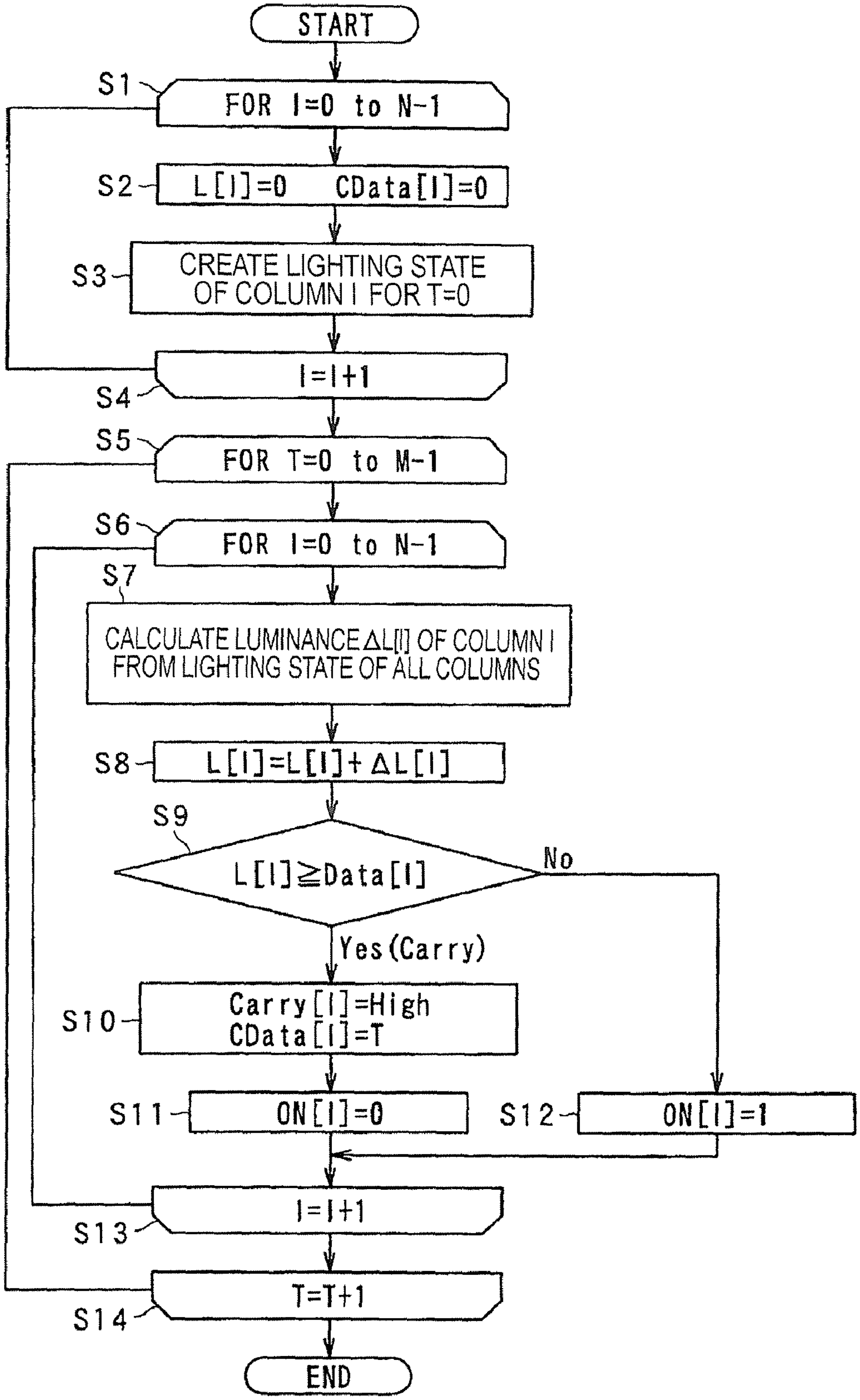
FIG. 3 is a flowchart showing an operation of a corrected data calculation unit according to the first embodiment.

Next, the operation of the corrected data calculation unit 202 is explained with reference to FIG. 3. Although the corrected data calculation unit 202 partially executes the parallel process with plural luminance accumulation circuit 100, the parallel process is shown as a sequential process in the flowchart of FIG. 3 for the convenience of description. In FIG. 3, N represents the number of the column wirings, M: the number of the calculation slots, Data[I]: the target luminance value of column I, CData[I]: the corrected data of column I, L[I]: the accumulated luminance of column I, ΔL[I]: the instantaneous luminance of column I, and ON[I]: the lighting state of column I (1: lighted, 0: not lighted).

Once the image data D1 of one horizontal scanning period is retrieved, the first step is to initialize the accumulated luminance L[I] and the corrected data CData[I] of each column I to 0 (S2). Incidentally, the corrected data CData[I] is a value held in the register 105. In the presence of N column wirings, I assumes the value of 0 to (N−1).

Next, the lighting pattern calculation circuit 101 analyzes the image data D1 and calculates the lighting pattern at the time point where the calculation time slot T is 0 (S3). When T is 0, the lighting state of the display device on column I is given as described below.

ON (lighted) (1) if the image data D1[I]>0

OFF (not lighted) (0) if the image data D1[I]=0

Once the lighting pattern at the time point of the time slot T=0 is calculated (S1 to S4), this lighting pattern is input to the luminance calculation circuit 102 in the luminance accumulation circuit 100 for each column. The luminance calculation circuit 102 for column I calculates the luminance ΔL[I] of the display device on column I for time slot T based on the lighting pattern (S7).

Upon calculation of the luminance ΔL[I], the calculation result is input to the accumulation circuit 103. The accumulation circuit 103 accumulates the luminance ΔL[I] in synchronism with the timing signal from the timing controller 107 (S8). Specifically, the instantaneous luminance ΔL[I] for the present slot is added to the accumulated luminance value L[I] up to the preceding slot. At this time, the slot number counter 108 is also counted up. The accumulation circuit 103 outputs the accumulated luminance L[I] to the comparator 104.

The comparator 104 compares the target luminance value Data[I] corresponding to each column wiring with the accumulated luminance L[I] (S9). According to this embodiment, the target luminance value Data[I] is identical with the value of the image data D1[I].

At the time point when the accumulated luminance L[I] is equal to or larger than Data[I], the output Carry[I] of the comparator 104 turns High (S10). Once Carry[I] turns High, the register 105 holds the prevailing value of the slot number counter 108 as the corrected data CData[I] (S10). Carry[I] is supplied also to the lighting pattern calculation circuit 101. Once Carry[I] turns High, the lighting pattern calculation circuit 101 sets the lighting state ON[I] of the display device of column I to 0 (S1). As a result, the lighting pattern is updated. The lighting pattern thus updated is accessed for the calculation of the luminance ΔL of the next slot.

In the case where the accumulated luminance L[I] is smaller than the target value Data[I] in step S9, Carry[I] is low, and therefore, the value of the lighting state ON[I] is maintained at 1 (S12).

The operation of steps S6 to S13 is repeated, and at the time point when the values Carry[I] for the circuits corresponding to all the column wirings turns High, all the values of the corrected data CData[I] for the particular horizontal period are stored in the register 105.

Once the corrected data of all the column wirings for one horizontal scanning period are finally determined, the particular values thus determined are loaded in parallel on the shift register 106. The shift register 106 serializes the parallel data based on the signal from the timing controller 107 (the shift clock sft_clk, load "load", and shift enable sft_en). The data thus serialized is supplied to the pseudo-gradation unit 208 as the corrected data D2.

The operation of the corrected data calculation circuit 202 is summarized as follows:

(1) The lighting pattern calculation circuit 101 calculates the first lighting pattern (T=0).

(2) With reference to the lighting pattern, the luminance calculation circuit 102 calculates the instantaneous luminance ΔL including the effect of the voltage drop in the row wiring for each calculation time slot.

(3) The accumulation circuit 103 temporally accumulates the luminance ΔL for each calculation slot and thus calculates the accumulated luminance value L.

(4) The comparator 104 and the register 105 store, as corrected data, the value determined for the calculation slot (value on the slot number counter) at the time point when the accumulated luminance value L reaches the target value Data.

(5) Each time the corrected data for any column is determined, the lighting pattern calculation circuit 101 updates the lighting pattern (turning off the column for which the corrected data is determined).

(6) After the corrected data are finally determined for all the columns, the shift register 106 outputs the corrected data D2 for all the columns. In this case, the comparator 104, the register 105 and the shift register 106 make up the corrected data determination circuit according to this invention.

As described above, the corrected data calculation unit 202 calculates the corrected data while taking the change in the lighting state of each display device due to the correction into consideration, thereby improving the accuracy of the voltage drop correction.

The corrected data calculation unit 202 further improves the correction accuracy by calculating the luminance in accordance with the calculation slot shorter than the modulation slot. This point is described in detail below with reference to FIG. 1.

FIG. 1 shows an example of the calculation of the corrected data with the calculation slot set to the length one fourth of the modulation slot. In FIG. 1, the uppermost graph indicates the modulation slot, and the second upper graph the calculation slot. The third graph indicates the instantaneous luminance ΔL of each slot (the vertical axis represents the magnitude of luminance). It is understood that the luminance is reduced as compared with the case free of the voltage drop (signal loss). The fourth graph indicates the accumulated value L of the instantaneous luminance ΔL for each calculation slot (the vertical axis represents the magnitude of luminance).

In the case of FIG. 1, for example, "4" is input as the image data D1. The luminance ΔL is calculated for each calculation slot and accumulated sequentially. Assuming that the accumulated value L exceeds the target value "4" on the 30th calculation slot, "30" is output as the corrected data. In this way, the calculation of the corrected data has the resolution four times as large the process of the pulse width modulation. As a result, the voltage drop can be corrected more accurately.

(Pseudo-Gradation Unit 208)

The corrected data D2 output from the corrected data calculation unit 202 cannot be input as it is to the modulation circuit. This is by reason of the fact that the number of the calculation slots is larger than the number of the modulation slots, and therefore, the corrected data D2 fails to coincide with the modulation data in scale. In the case where the slot ratio (the ratio of the calculation slots to the modulation slots) is set to ¼ as shown in the case of FIG. 1, the corrected data D2 is required to be converted to the modulation data by setting the value of the corrected data D2 to ¼.

Since one fourth of the corrected data "30" is "7.5", the decimal fraction would be discarded by the simple process, resulting in the modulation data of "7". This rounding error would reduce the significance of the calculation of the corrected data with a high resolution.

In converting the corrected data D2 into the modulation data D3, therefore, the pseudo-gradation unit 208 reduces the bit width of the corrected data D2 by pseudo-gradation processing (quantization processing). As a result, the luminance corresponding to the decimal fraction generated by the bit width reduction is reflected in the display and the rounding error is minimized to a maximum extent. The pseudo-gradation processing may use either the dithering scheme or the error diffusion scheme. Also, the dithering in the spatial direction (i.e., one-dimensional image along rows or columns or two-dimensional image) or in the temporal direction (frame direction) may be employed. According to this embodiment, the correction with a very high accuracy can be achieved by displaying the image by supplying the modulation circuit with the modulation data D3 converted using the 2×2 ordered dithering.

(Simplified Corrected Data Calculation Unit 202)

Figure 4:
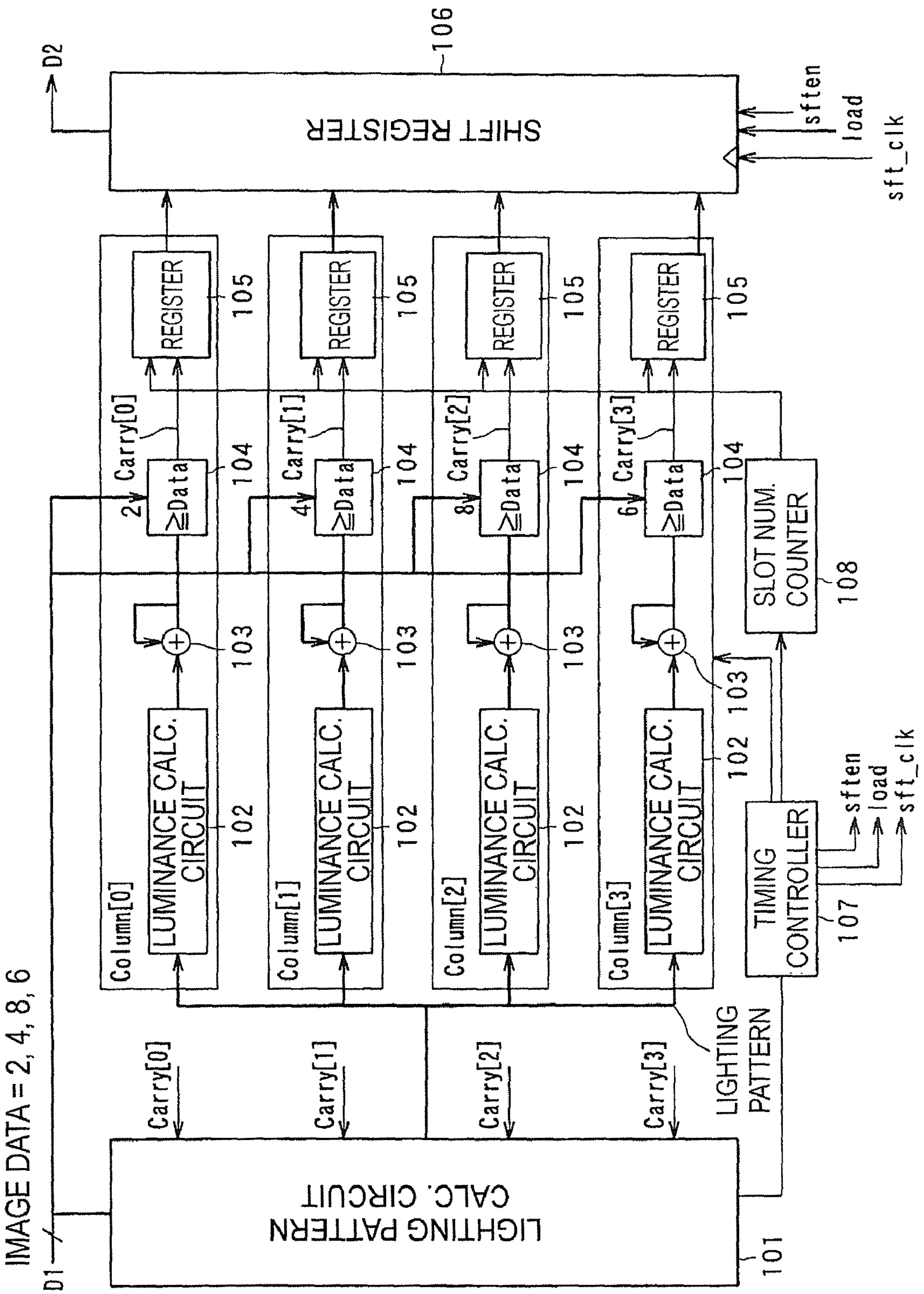
FIG. 4 is a diagram showing a simplified configuration of the corrected data calculation unit according to the first embodiment.

With reference to FIG. 4, the operation of the corrected data calculation unit having a very simplified configuration is specifically explained. Actually, the image display apparatus has several hundred to several thousand column wirings. To simplify the explanation, however, the image display apparatus is assumed to have four column wiring. The calculation slots are set to one half of the modulation slots.

Assume that the image data D1 of the column wirings are 2, 4, 8, 6 for a given horizontal scanning period. When the image data D1 is input thereto, the lighting pattern calculation circuit 101 calculates the lighting pattern for the time slot T=0. Since the image data for all the columns are larger than zero, the lighting pattern (1, 1, 1, 1) is obtained, where "1" indicates the on state (lighted) and "0" the off state (not lighted). The column wirings 0 to 3 are in the lighting state in that order from the left side.

The lighting pattern is input to the luminance calculation circuit 102 to calculate the instantaneous luminance ΔL for the lighting pattern. The accumulation circuit 103 accumulates the instantaneous luminance ΔL for each column thereby to calculate the accumulated luminance value L corresponding to the calculation slots. The comparator 104 compares the accumulated luminance value L with the target luminance value Data for each column.

Figure 5:
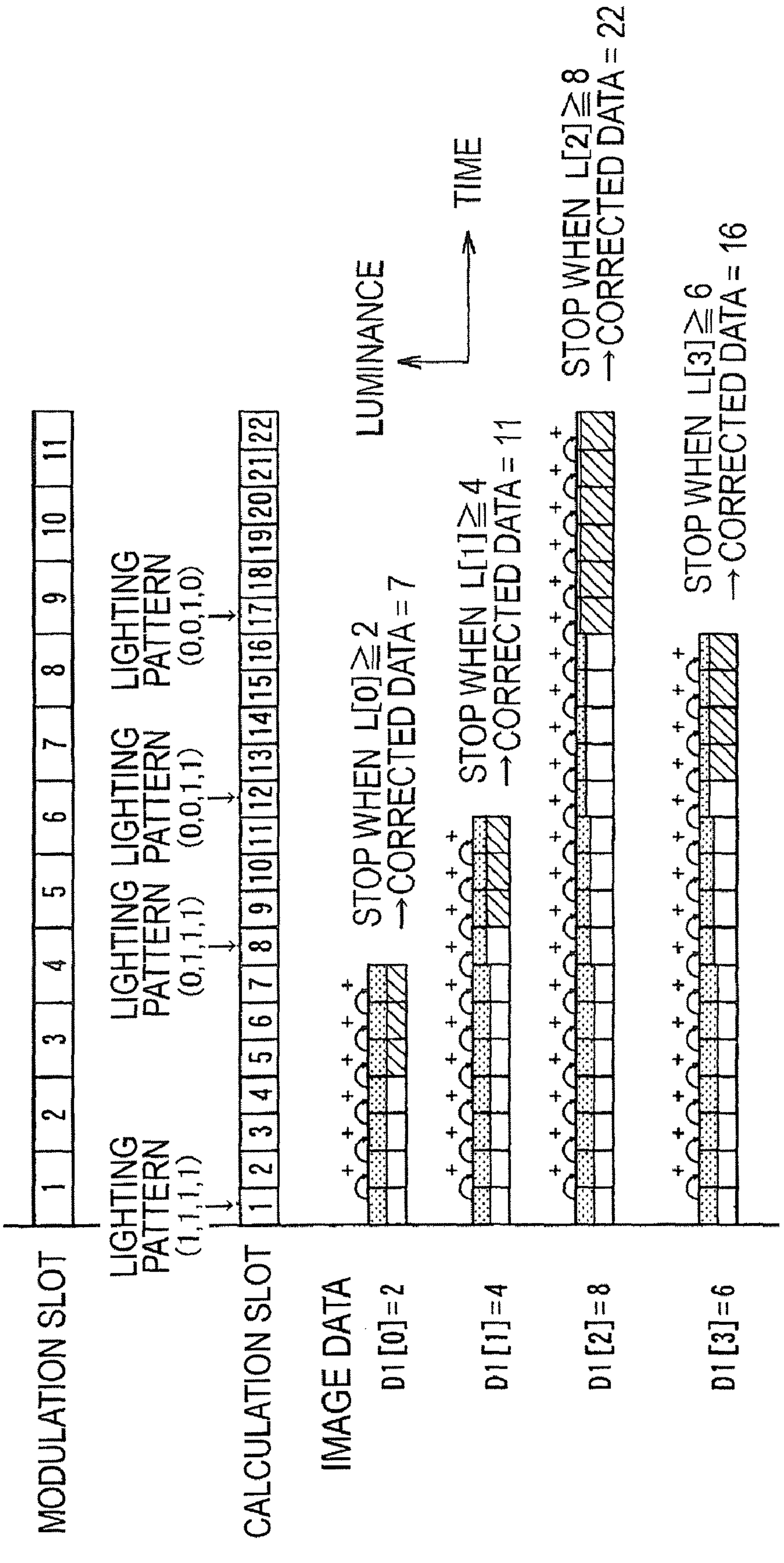
FIG. 5 is a diagram showing an example of calculation of the corrected data in the corrected data calculation unit shown in FIG. 4.

FIG. 5 is a diagram showing an example of the calculation of the corrected data. In FIG. 5, the uppermost graph shows the modulation slots, and the second uppermost graph the calculation slots (the horizontal axis represents the time). The third to sixth graphs show the corrected data for the column wirings 0 to 3, respectively (the vertical axis represents the magnitude of luminance, and the horizontal axis the time).

In the third to sixth graphs, the rectangle for each calculation slot indicates the luminance of the particular slot. The upper dotted part of each rectangle indicates the luminance reduction due to the voltage drop, and the lower white part of each rectangle the effective luminance, i.e. the luminance taking the effect of the voltage drop into consideration. The hatched part indicates the luminance complemented by the extension of the pulse width in the correction calculation. Incidentally, since the width of the calculation slot is one half of the width of the modulation slot, one rectangle indicates the luminance of 0.5.

The image data D1[0] for the modulation wiring 0 is 2. The luminance calculation circuit 102 calculates the luminance ΔL (white part in FIG. 5) including the effect of the voltage drop for each calculation slot, and the accumulation circuit 103 accumulates the luminance ΔL. The comparator 104 compares the accumulated luminance L with the image data (=2), and turns Carry[0] High for the calculation slot (slot 7 in FIG. 5) at the time point when the accumulated value L reaches 2. As a result, the corrected data of the column wiring 0 becomes "7".

The lighting pattern calculation circuit 101 updates the lighting pattern when Carry[0] turns High. The column wirings 0 are turned off (not lighted), and therefore, the lighting pattern changes from (1, 1, 1, 1) to (0, 1, 1, 1). Once the lighting pattern is updated, the effect of the voltage drop amount changes. In FIG. 5, the size of the dotted part is changed before and after the time slot 7.

Next, the accumulated luminance value L for the column wiring 1 with the calculation slot 11 exceeds the image data (=4) thereof. As a result, the corrected data for the column wiring 1 is determined as 11, and Carry[1] turns High. The lighting pattern changes from (0, 1, 1, 1) to (0, 0, 1, 1).

Next, the accumulated luminance value L for the column wiring 3 with the calculation slot 16 exceeds the image data (=6). As a result, the corrected data for the column wiring 3 is determined as 16, and Carry[3] turns High. The lighting pattern changes from (0, 0, 1, 1) to (0, 0, 1, 0).

Next, the luminance value for the column wiring 2 with the calculation slot 22 exceeds the image data (=8) thereof. As a result, the corrected data for the column wiring 2 is determined as 22, and Carry[2] turns High.

As described above, the corrected data 7, 11, 22, 16 are obtained for the input image data 2, 4, 8, 6, respectively.

These corrected data are converted to the modulation data in the pseudo-gradation unit. In the case shown, the calculation slot is one half of the modulation slot, and therefore, the bit width of the corrected data is one bit greater than that of the modulation data. The pseudo-gradation unit outputs the modulation data by reducing the bit width of the corrected data by one bit. According to this embodiment, the modulation data of 4, 5, 11, 8, for example, are obtained by executing the pseudo-gradation processing.

The corrected data obtained in this way is supplied to the modulation circuit for driving, so that the image of high quality substantially free of the effect of the voltage drop can be realized.

Incidentally, the actual image display apparatus includes several hundred to several thousand column wirings and the slots in the order of several hundreds to several thousands. Nevertheless, the method described with reference to FIGS. 4 and 5 is of course applicable to the actual image display apparatus.

According to the embodiment described above, the value of the image data is used as the target luminance value compared with the accumulated luminance value. The target luminance value and the image data value, however, are not necessarily coincident with each other. For example, the target luminance value may be changed with what is used as a reference for normalization of the luminance ΔL calculated by the luminance calculation circuit.

(Example of Calculation Slot)

Figures 11A, 11B, 11C, 11D:
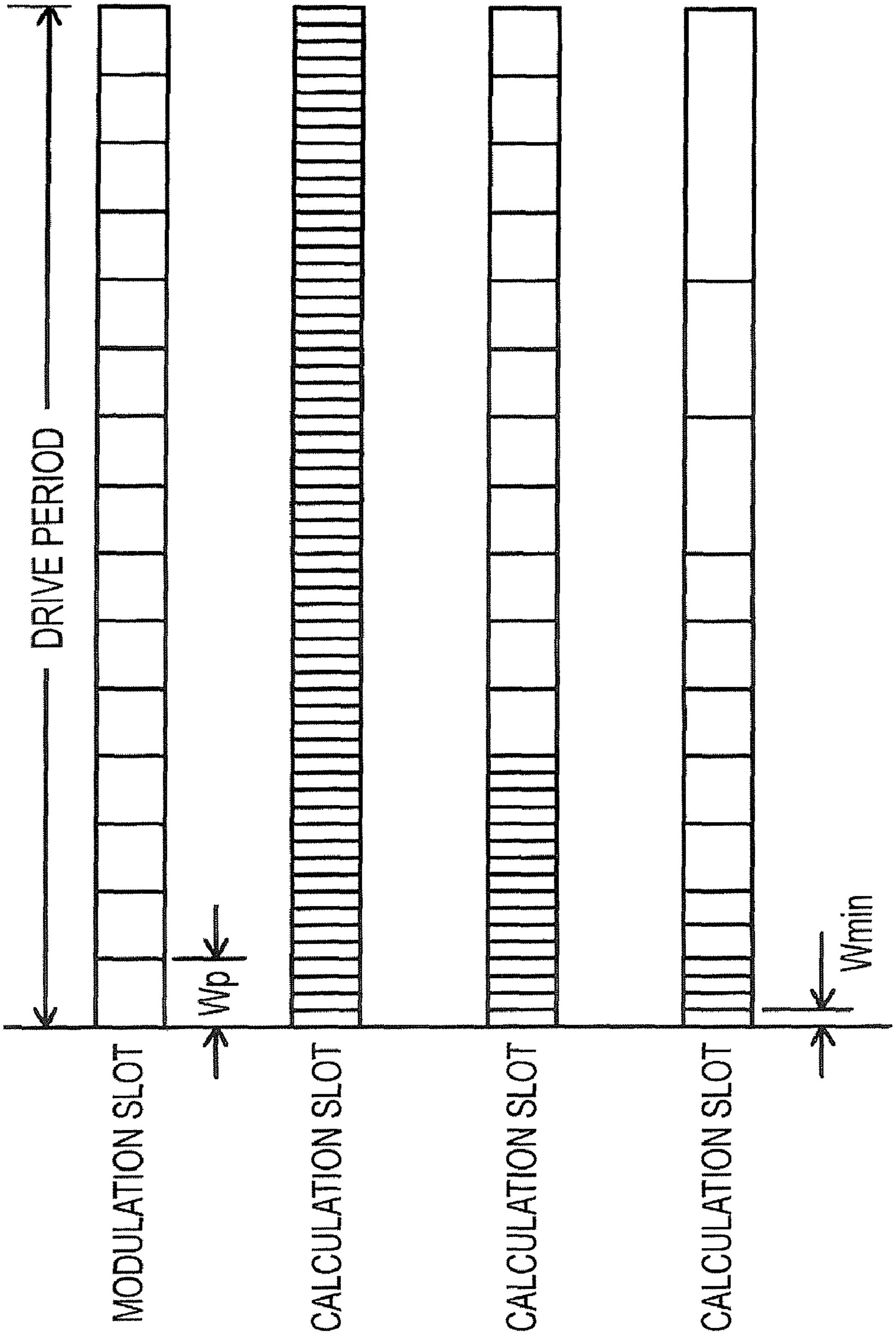
FIGS. 11A to 11D are diagrams showing an example of calculation slots.

With reference to FIGS. 11A to 11D, an example of the calculation slot is explained. FIG. 11A shows an example of the modulation slot. The width of the modulation slot is constant through the whole drive period. FIGS. 11B to 11D show examples of the calculation slot. Although FIGS. 11A to 11D show only several to ten and several slots, the actual image display apparatus has several hundred to several thousand slots as described above.

According to the embodiment described above, as shown in FIG. 11B, the width of the calculation slot is fixed (for example, one fourth of that of the modulation slot) over the whole drive period. The width of the calculation slot, however, is not necessarily constant, but may be changed during the drive period. For example, the calculation slot may be shorter than the modulation slot in a part of the drive period and as long as or longer than the modulation slot in the other part of the drive period. The visual characteristic of the human being is such that the resolution tends to be higher, the lower the luminance (gradation). During the period at least corresponding to the low-luminance area in the drive period (for example, the first one third of the drive period), therefore, the calculation slot can be effectively made shorter than the modulation slot (FIG. 11C). Conversely, the visual characteristic of the human being is such that the resolution tends to be lower, the higher the luminance (gradation). During the period corresponding to the high-luminance area (for example, the last one third of the drive period), therefore, the calculation slot may be made longer than the modulation slot in the period corresponding to the low-luminance area. The width of the calculation slot may be changed in any number of stages. For example, the calculation slot width may be gradually increased (FIG. 11D). In the case where the slot width is changed as shown in FIGS. 11C and 11D, however, the value of the instantaneous luminance ΔL per slot or the count-up of the slot number counter is required to be adjusted in accordance with the slot width.

The width of the calculation slot for a partial period (for example, the period corresponding to the high-luminance area) may be made longer than that of the modulation slot (FIG. 11D). It is more preferable to reduce the total number of the calculation slots as compared with the total number of the modulation slots for the drive period as a whole. The smaller the number of the calculation slots, the more the clock frequency of the correction circuit can be reduced. This is by reason of the fact that the correction operation is required to be finished within a predetermined time, and the reduction in the total number of slots increases the time assignable to each slot. The reduction in clock frequency advantageously simplifies the circuit and reduces the cost and the heat generation.

Also, as described above, the visual characteristic of the human being so related to the magnitude of luminance that the resolution tends to increase with the decrease in gradation, and vice versa. Taking this point into consideration, the calculation slots are more advantageously made unequal only to suppress the correction error.

In the case where the calculation slots are made unequal or disuniform, i.e. in the presence of plural widths of the calculation slot, the number of bits for the pseudo-gradation process is preferably determined in keeping with the shortest calculation slot. For example, let Wmin be the width of the shortest calculation slot and Wp the width of the modulation slot. As long as the relation $Wmin \times 2^m = Wp$ (m: integer not less than 1) holds, the number of bits should be reduced by m using the pseudo-gradation processing (dithering processing). As a result, the accuracy of the correction circuit and the number of bits reduced by the pseudo-gradation processing can be set in correspondence with each other without any waste and a very satisfactory correction result can be obtained. Incidentally, in FIG. 11D, the width Wp is four times ($2^2$ times) larger than the width Wmin, and therefore, the 2×2 dither matrix should be used, for example, to reduce the number of bits by 2.

As described above, for the convenience of calculation of the dithering process, the relation between the width W of the calculation slot and the width Wp of the modulation slot is preferably held as $W \times 2^n = Wp$ (n: integer not less than 1). By holding the width of the two types of slots in this relation, the conversion from the corrected data to the modulation data is facilitated.

Second Embodiment

In the first embodiment, as shown in FIG. 9, the luminance accumulation circuit is arranged for each column wiring. According to the second embodiment, in contrast, plural column wirings are divided into plural blocks, and the luminance accumulation circuit is arranged for each block. By executing the process block by block, the corrected data can be calculated quickly while at the same time making it possible to reduce the circuit size advantageously.

Figure 7:
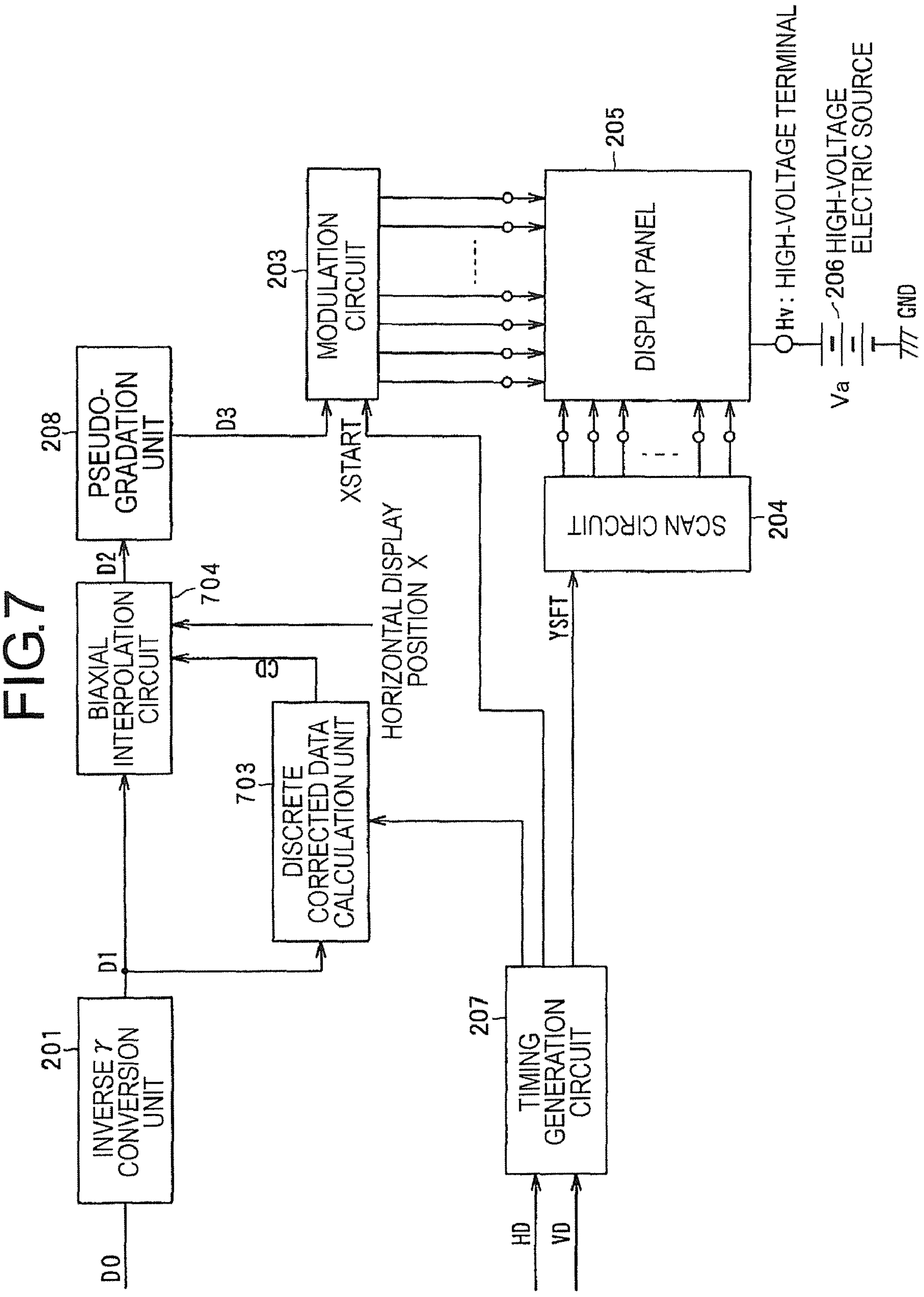
FIG. 7 is a block diagram showing an image display apparatus according to the second embodiment.

FIG. 7 is a diagram showing the configuration of the image display apparatus according to a second embodiment. The second embodiment is different from the first embodiment in that the corrected data calculation unit 202 is replaced by a discrete corrected data calculation unit 703 and a biaxial interpolation circuit 704. In this case, the discrete corrected data calculation unit 703, the biaxial interpolation circuit 704 and the pseudo-gradation unit 208 make up the correction circuit. The other parts of the configuration are similar to the corresponding parts of the configuration of the first embodiment. The description that follows is centered on the configuration unique to the second embodiment, and the same parts of the configuration of the second embodiment as those of the first embodiment are not described.

As explained above, the plural column wirings are divided into plural blocks, and a node is set for each block. Typically, the column wiring at the center of the block is selected as a node. Each node can be considered a reference position set on the row wiring. Also, with regard to the value of the image data, plural reference values of the image data are set in advance. In the case where the image data assume the values 0 to 255, for example, the image data reference values are determined as 0, 4, 8, 12, 16, . . . , 252, and 255. Incidentally, the number of blocks, the reference position (node position), the number of the image data reference values and the steps may be arbitrarily determined.

The discrete corrected data calculation unit 703 calculates the accumulated luminance value corresponding to each reference position taking the voltage drop at each reference position into consideration, and thus calculates the discrete corrected data for each reference position. Also, the discrete corrected data calculation unit 703 calculates the discrete corrected data for each image data reference value using the aforementioned image data reference value as a target luminance value. As a result, the corrected data are obtained discretely for plural reference positions on the row wiring and plural reference values of the image data. This discrete corrected data CD is input to the biaxial interpolation circuit 704.

The biaxial interpolation circuit 704 interpolates the discrete corrected data over two axes along the rows and the direction of the image data value and generates the corrected data D2 corresponding to the value of the image data D1 for each column wiring (horizontal display position X). An arbitrary interpolation method such as the linear interpolation can be employed. An example of the interpolation method is described in Japanese Patent Application Laid-Open No. 2003-223131 (US 2003/0006976 A1; U.S. Pat. No. 7,079,161).

The corrected data D2 calculated in this way is input to the pseudo-gradation unit 208, and the bit width thereof is reduced as in the first embodiment. The output D3 of the pseudo-gradation unit 208 is input to the modulation circuit 203. The modulation circuit 203 carries out the pulse width modulation in accordance with the modulation data D3 and outputs the modulation signal to the column wiring.

(Discrete Corrected Data Calculation Unit 703)

Figure 6:
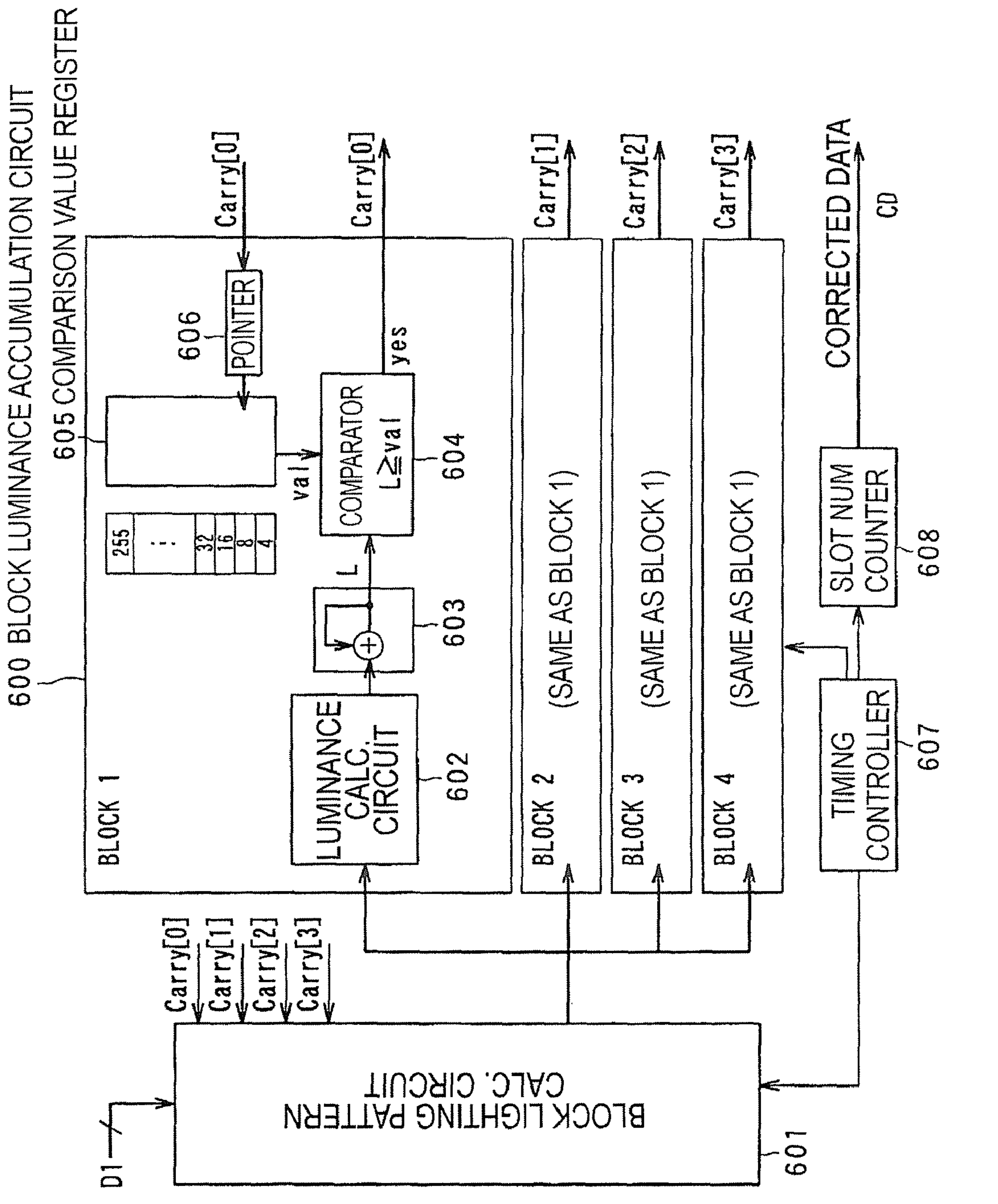
FIG. 6 is a diagram showing a configuration of a discrete corrected data calculation unit according to a second embodiment.

FIG. 6 shows the configuration of the discrete corrected data calculation unit. The discrete corrected data calculation unit 703 includes a block lighting pattern calculation circuit 601, a block luminance accumulation circuit 600, a timing controller 607 and a slot number counter 608. The block luminance accumulation circuit 600 is configured of a luminance calculation circuit 602, an accumulation circuit 603, a comparator 604, a comparison value register 605 and a pointer 606. The block luminance accumulation circuit 600 is provided for each block.

Figure 8:
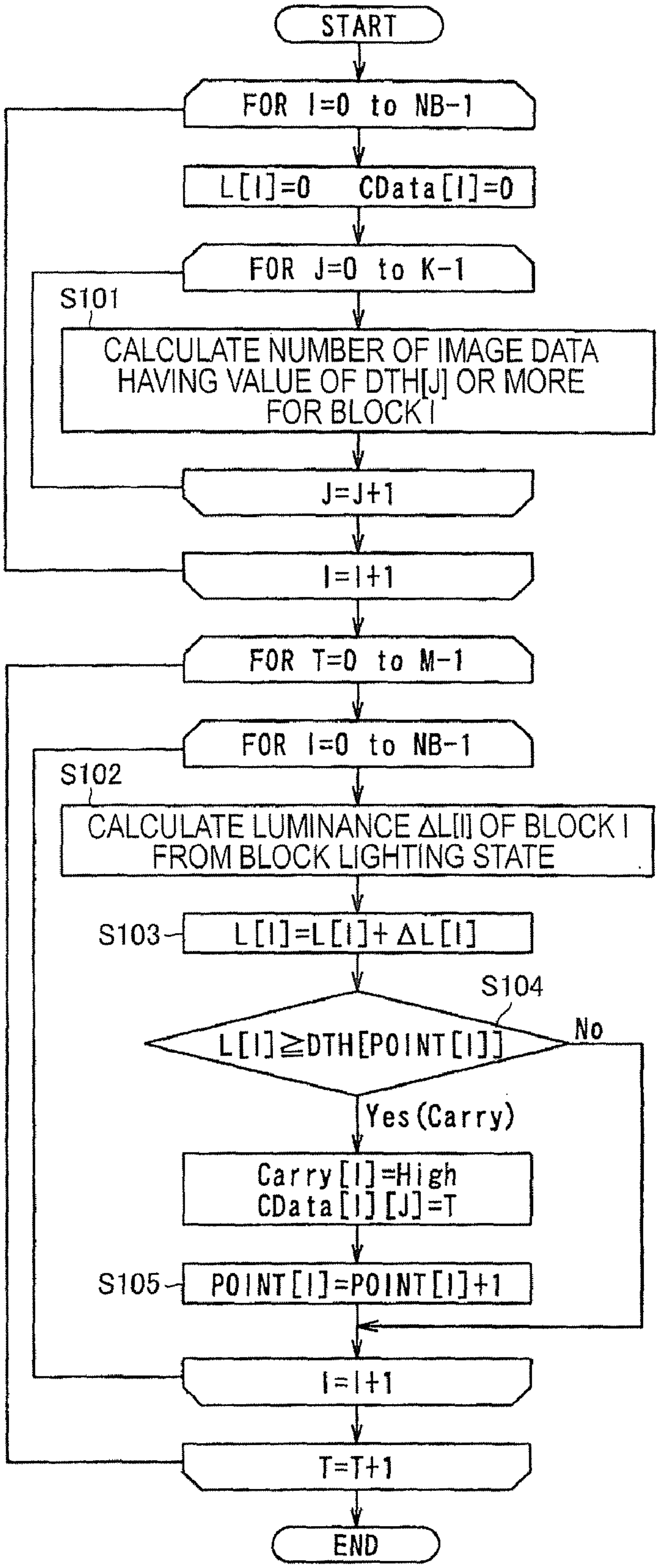
FIG. 8 is a flowchart showing an operation of the discrete corrected data calculation unit according to the second embodiment.

FIG. 8 is a flowchart for explaining the operation of the circuit shown in FIG. 6. Incidentally, the flowchart is described as a sequential process instead of as a parallel process for the convenience of explanation. In FIG. 8, NB represents the number of the blocks, M: the number of the calculation slots, K: the number of the image data reference values, DTH[I]: the I-th image data reference value, CData [I][J]: the corrected data for the J-th image data reference value of the block I, L[I]: the accumulated luminance of block I, ΔL[I]: the instantaneous luminance of block I, and POINT [I]: the pointer of block I.

Like in the first embodiment, the calculation slot is determined by the clock signal output from the timing controller 607. The clock period is controlled in such a manner that the calculation slot is shorter than the modulation slot in at least a part of the drive period assigned to the drive of one row of display devices (the period corresponding to a low luminance area, for example).

The block lighting pattern calculation circuit 601 calculates the lighting pattern of four blocks. Although the lighting state of each column wiring is indicated by one on/off bit in the first embodiment, the lighting state of each block is indicated by 3-bit data proportional to the lighting ratio in the second embodiment. The lighting ratio is defined as the ratio of the display devices turned on to all the display devices making up the block.

The block lighting pattern calculation circuit 601 calculates the histogram of the image data for each block with reference to the image data (S101 in the flowchart). FIG. 10 shows an example of the histogram calculated from the image data on a given one row. The block lighting pattern calculation circuit 601 counts the number of the image data having a higher value than each image data reference value, and converts the count into a 3-bit value (0 to 7 in binary number) for each image data reference value. This 3-bit value indicates the ratio of the count to the number of the image data in one block. Specifically, this 3-bit value represents the ratio of the number of the turned-on display devices to the number of all the display devices in one block for the slot corresponding to the image data reference value. According to this embodiment, the value of the histogram shown in FIG. 10 is used as a lighting pattern.

The lighting pattern indicated in three bits for each block or a total of 12 bits is input to the luminance calculation circuit 602 of the block luminance accumulation circuit 600. In the first time slot, the value (7, 7, 7, 7) of "≧0" is selected as the lighting pattern.

The luminance calculation circuit 602 calculates the instantaneous luminance ΔL for block in accordance with the 12-bit lighting pattern (S102). The luminance calculation circuit 602 outputs, as the instantaneous luminance ΔL of the block, the instantaneous luminance value corresponding to the column wiring (node) at the center of the block. The instantaneous luminance is calculated by the same method as in the first embodiment. According to this embodiment, the instantaneous luminance ΔL for each calculation slot is calculated by the luminance calculation circuit 602 using a table (memory) which outputs an instantaneous luminance in response to the lighting pattern input thereto.

The instantaneous luminance ΔL for the block calculated in the luminance calculation circuit 602 is input to the accumulation circuit 603. The accumulation circuit 603 accumulates the instantaneous luminance ΔL in accordance with the count-up of the slot number counter 608 and thus calculates the accumulated luminance value L up to the particular calculation slot (S103). The accumulated luminance value L is input to the comparator 604.

The comparator 604 compares the accumulated luminance value L with the image data reference value DTH. Once the accumulated value L reaches the image data reference value DTH, the comparator 604 turns Carry High (S104).

After Carry turns High, the pointer 606 advances the pointer by one so that the value on the comparison value register 605 changes by one (S105). The comparison value register 605 has recorded therein predetermined plural image data reference values, and with the change in the pointer 606, the next reference value is input to the comparator 604. In the beginning of accumulation (when the calculation slot is 0), the value on the pointer 606 is reset and the smallest image data reference value is input to the comparator 604.

The value on the slot number counter at the time point when Carry of a given block turns High is the corrected data value corresponding to the image data reference value that has been input to the comparator at the particular time point.

The Carry signal of each block is fed back to the block lighting pattern calculation circuit 601 and the block lighting pattern is updated correspondingly. Once the Carry signal turns High, the lighting pattern of the corresponding block is changed to the lighting state corresponding to the next data reference value.

According to this embodiment, this operation is repeated thereby to calculate the corrected data for the discrete image data reference value for each block.

The corrected data calculated in this way is input to the biaxial interpolation circuit as described above to conduct the interpolation in accordance with the image data and the horizontal position (column wiring number) of the screen. In this way, the corrected data corresponding to the image data value of each column wiring is calculated.

As the result of this calculation of the corrected data, it has been found that the calculation amount is decreased more than in the first embodiment for a large reduction in the hardware amount. The further study of the effect of the correction has made it clear that though inferior to the first embodiment due to the error caused by the interpolation, the correction accuracy is improved as compared with the prior art, and an image very high in quality can be displayed.

According to this embodiment, the discrete corrected data is calculated for the horizontal position of the row wiring and the image data value. Nevertheless, this invention is not limited to this method. For example, only the direction of the image data size or only the horizontal direction of the screen may be discretized with equal effect.

Also in the second embodiment, the correction accuracy can be further improved by setting the calculation slot in the same manner as in the first embodiment.

Modification

According to the first and second embodiments, the correction is made by increasing the image data value to compensate for the luminance reduction by the effect of the voltage drop. Nevertheless, the image data value generally has a certain upper limit. To achieve a satisfactory correction, therefore, the adjustment is preferable by which the image data after correction assumes a value within the particular limit. For this purpose, the maximum value of the image data after correction is adjusted by a limiter or the gain of the image data before or after correction is adjusted. This technique is already disclosed by the present inventor in Japanese Patent Application Laid-Open No. 2003-233344 (US 2003/030654 A1; U.S. Pat. No. 6,873,308). By combining this technique with this invention, the correction can be suitably carried out on the one hand and the maximum value of the image data can be suitably adjusted at the same time.

In the image display apparatus having the surface conduction electron-emitting device, several types of the conventional correction circuits are known as a configuration to realize a high-quality image display. Japanese Patent Application Laid-Open No. 2005-031636 (US 2004/257311 A1; U.S. Pat. No. 7,046,219; US 2006/192493 A1; U.S. Pat. No. 7,432,884) discloses a configuration for suppressing the reduction in image quality which otherwise might be caused by the halation (correction of the halation). Japanese Patent Application Laid-Open No. 07-181911, on the other hand, discloses a configuration for correcting the variations of the device luminance (correction of uniformity). The prevent inventor has confirmed that a more preferable display can be made possible by combining these correction methods with the correction method according to the present invention. As to the order of correction, the image data subjected to the inverse γ conversion is first corrected in halation, after which the uniformity is corrected. Further, on the subsequent image data, the voltage drop is corrected according to the invention. As a result, a more preferable image display can be realized.

Further, in the case where the light emission characteristic of the phosphor is nonlinear with respect to the drive operation, a table may be arranged to offset the phosphor nonlinearity before or after the voltage drop correction. This further makes it possible to realize a preferable image display.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-50345, filed on Feb. 29, 2008, which is hereby incorporated by reference herein in its entirety.

What is claimed is:

1. An image display apparatus for driving a plurality of display devices through a plurality of row wirings and a plurality of column wirings in matrix, comprising:

a modulation circuit that outputs a pulse width modulation signal for driving the display device to the column wiring based on modulation data; and a correction circuit that outputs the modulation data to be applied to the modulation circuit, based on luminance data designating luminance of the display device, wherein the correction circuit includes:

a timing control circuit that divides a drive period assigned for drive of the display devices into a plurality of calculation slots;

a luminance calculation circuit that calculates luminance including an effect of a voltage drop in the row wiring for each calculation slot;

an accumulation circuit that temporally accumulates the luminance for each calculation slot;

a corrected data determination circuit that outputs, as a corrected data, a value determined in accordance with the calculation slot at a time point when an accumulated luminance value obtained by the temporal accumulation reaches a target luminance value; and a conversion circuit that converts the corrected data into the modulation data;

wherein a width of the calculation slot is shorter than a width of a slot for pulse width modulation by the modulation circuit in at least a part of the drive period; and wherein the conversion circuit reduces a bit width of the corrected data by pseudo-gradation processing.

2. The image display apparatus according to claim 1, wherein a relation between the width W of the calculation slot and the width Wp of the slot for the pulse width modulation in the part of the drive period is given as:

$$W \times 2^n = Wp$$

(n: integer not less than 1).

3. The image display apparatus according to claim 1, wherein there are a plurality of widths of the calculation slot, wherein a relation between the width Wmin of the shortest calculation slot and the width Wp of the pulse width modulation slot is given as:

$$W\text{min} \times 2^m = Wp$$

(m: integer not less than 1), and wherein the bit width reduced by the conversion circuit is m bits.

4. The image display apparatus according to claim 1, wherein the part of the drive period corresponds to a low-luminance area in the drive period.

5. The image display apparatus according to claim 1, wherein the width of the calculation slot for a period corresponding to a high-luminance area in the drive period is longer than the width of the calculation slot for a period corresponding to a low-luminance area in the drive period.

6. The image display apparatus according to claim 1, wherein the width of the calculation slot in a period corresponding to a high-luminance area in the drive period is longer than the width of the slot for the pulse width modulation.

7. The image display apparatus according to claim 1, wherein the number of the calculation slots for the whole drive period is smaller than the number of the slots for the pulse width modulation for the whole drive period.

8. The image display apparatus according to claim 1, wherein the luminance calculation circuit and the accumulation circuit are provided for each column wiring.

9. The image display apparatus according to claim 1, wherein the plurality of the column wirings are divided into a plurality of blocks, wherein the luminance calculation circuit and the accumulation circuit calculate the accumulated luminance value for each block, wherein the corrected data determination circuit outputs discrete corrected data for each block based on the accumulated luminance value for each block, and wherein the correction circuit includes an interpolation circuit that generates the corrected data for each column wiring by interpolating the discrete corrected data for each block.

10. The image display apparatus according to claim 9, wherein the corrected data determination circuit outputs the discrete corrected data for each reference value by using predetermined reference values as a target luminance value, and wherein the interpolation circuit generates the corrected data corresponding to the value of the luminance data by interpolating the discrete corrected data for each of the reference values.

11. The image display apparatus according to claim wherein the luminance calculation circuit calculates the luminance including the effect of the voltage drop in the row wiring based on a lighting state of the display devices.

12. The image display apparatus according to claim 11, wherein the lighting state of the display devices is changed when the accumulated luminance value reaches at the target luminance value.

13. The image display apparatus according to claim 1, wherein the conversion circuit reduces the bit width of the corrected data by dithering.

14. The image display apparatus according to claim 1, wherein the conversion circuit reduces the bit width of the corrected data by the error diffusion.

15. A correction circuit for an image display apparatus, wherein the image display apparatus drives a plurality of display devices through a plurality of row wirings and a plurality of column wirings in matrix, and includes a modulation circuit for outputting a pulse width modulation signal to the column wiring for driving the display device based on modulation data;

the correction circuit outputting the modulation data to be applied to the modulation circuit, based on luminance data designating luminance of the display device;

the correction circuit including:

a timing control circuit that divides a drive period assigned for drive of the display devices into a plurality of calculation slots;

a luminance calculation circuit that calculates luminance including an effect of a voltage drop in the row wiring for each calculation slot;

an accumulation circuit that temporally accumulates the luminance for each calculation slot;

a corrected data determination circuit that outputs, as a corrected data, a value determined in accordance with the calculation slot at a time point when an accumulated luminance value obtained by the temporal accumulation reaches a target luminance value; and a conversion circuit that converts the corrected data into the modulation data;

wherein a width of the calculation slot is shorter than a width of a slot for pulse width modulation by the modulation circuit in at least a part of the drive period; and wherein the conversion circuit reduces a bit width of the corrected data by pseudo-gradation processing.

16. An image display apparatus driving method for driving a plurality of display devices through a plurality of row wirings and a plurality of column wirings in matrix, comprising:

a correction step of outputting modulation data based on luminance data designating luminance of the display device; and a modulation step of outputting a pulse width modulation signal to the column wiring for driving the display device, based on the modulation data, wherein the correction step includes the steps of:

dividing a drive period assigned for drive of the display devices into a plurality of calculation slots;

calculating luminance including an effect of a voltage drop in the row wiring for each calculation slot;

temporally accumulating the luminance for each of the calculation slots;

outputting, as a corrected data, a value determined in accordance with the calculation slot at a time point when an accumulated luminance value obtained by the temporal accumulation reaches a target luminance value; and converting the corrected data into the modulation data, wherein a width of the calculation slot is shorter than a width of a slot for pulse width modulation by the modulation circuit in at least a part of the drive period, and wherein the modulation data is generated by reducing a bit width of the corrected data by pseudo-gradation processing.

* * * * *